United States Patent
Dunn et al.

(10) Patent No.: US 10,234,333 B2
(45) Date of Patent: Mar. 19, 2019

(54) TEMPERATURE SENSING DRAIN COVER

(71) Applicant: Munchkin, Inc., Van Nuys, CA (US)

(72) Inventors: Steven Bryan Dunn, Beverly Hills, CA (US); Mark Hatherill, Beverly Hills, CA (US); Kevin Douglas Johnson, Tarzana, CA (US); Richard Ernest Scott, Jr., Hermosa Beach, CA (US)

(73) Assignee: Munchkin, Inc., Van Nuys, CA (US)

( * ) Notice: Subject to any disclaimer, the term of this patent is extended or adjusted under 35 U.S.C. 154(b) by 283 days.

(21) Appl. No.: 15/417,160

(22) Filed: Jan. 26, 2017

(65) Prior Publication Data

US 2017/0211987 A1   Jul. 27, 2017

Related U.S. Application Data

(60) Provisional application No. 62/287,390, filed on Jan. 26, 2016.

(51) Int. Cl.
| | |
|---|---|
| *A47K 1/14* | (2006.01) |
| *G01K 1/02* | (2006.01) |
| *E03C 1/05* | (2006.01) |
| *E03C 1/14* | (2006.01) |
| *E03C 1/16* | (2006.01) |
| *G01D 5/26* | (2006.01) |
| *E03C 1/04* | (2006.01) |
| *E03C 1/23* | (2006.01) |

(52) U.S. Cl.
CPC ............... *G01K 1/02* (2013.01); *E03C 1/041* (2013.01); *E03C 1/055* (2013.01); *E03C 1/14* (2013.01); *E03C 1/16* (2013.01); *E03C 1/2306* (2013.01); *G01D 5/26* (2013.01); *G01K 2207/00* (2013.01)

(58) Field of Classification Search
CPC ...... G01K 1/02; G01K 2207/00; E03C 1/041; E03C 1/2306
USPC .............................................. 4/286, 293, 294
See application file for complete search history.

(56) References Cited

U.S. PATENT DOCUMENTS

| | | | |
|---|---|---|---|
| 3,949,433 A | * | 4/1976 | Liou ........................ A47K 1/14 4/295 |
| 5,302,028 A | | 4/1994 | Carey |
| 5,667,306 A | | 9/1997 | Montreuil et al. |
| 6,053,633 A | * | 4/2000 | Bilenker ................ G01K 13/02 374/156 |
| 6,105,618 A | * | 8/2000 | Blaney ..................... A47K 1/14 116/216 |
| 6,922,856 B2 | * | 8/2005 | Mazar .................... A47K 3/024 4/538 |

(Continued)

FOREIGN PATENT DOCUMENTS

| JP | 2000-309966 A | 11/2000 |
|---|---|---|
| JP | 2000309966 | 11/2000 |

OTHER PUBLICATIONS

International Written Opinion for PCT/US2017/015200, dated Aug. 9, 2018. (pp. 6).

(Continued)

*Primary Examiner* — Huyen Le
(74) *Attorney, Agent, or Firm* — Robert Z. Evora, Esq.

(57) ABSTRACT

A drain covering device is described with built in temperature sensors and lights which signal various measured temperatures which are acceptable, cold, or hot for an intended use. The device is easily separable and can be rinsed and stored using an attached suction cup.

20 Claims, 8 Drawing Sheets

(56) References Cited

U.S. PATENT DOCUMENTS

| | | | |
|---|---|---|---|
| 7,252,431 B1 * | 8/2007 | Caramanna | G01K 1/14 116/216 |
| 2009/0087534 A1 | 4/2009 | McLemore | |
| 2013/0340163 A1 | 12/2013 | Ball et al. | |

OTHER PUBLICATIONS

International Search Report and Written Opinion for PCT/US2017/015200, International Filing Date Jan. 26, 2017, dated Apr. 12, 2017 (pp. 12).

* cited by examiner

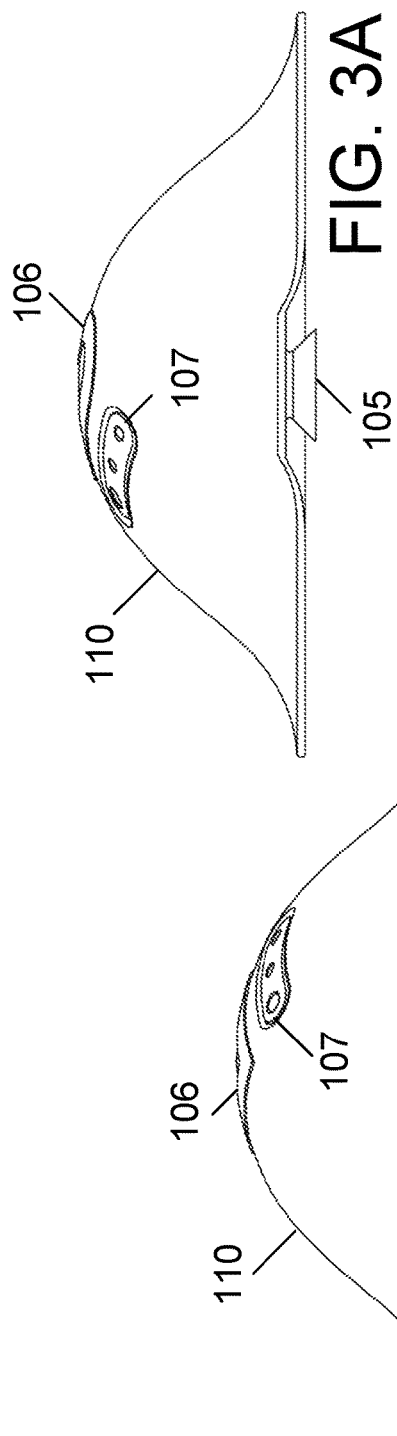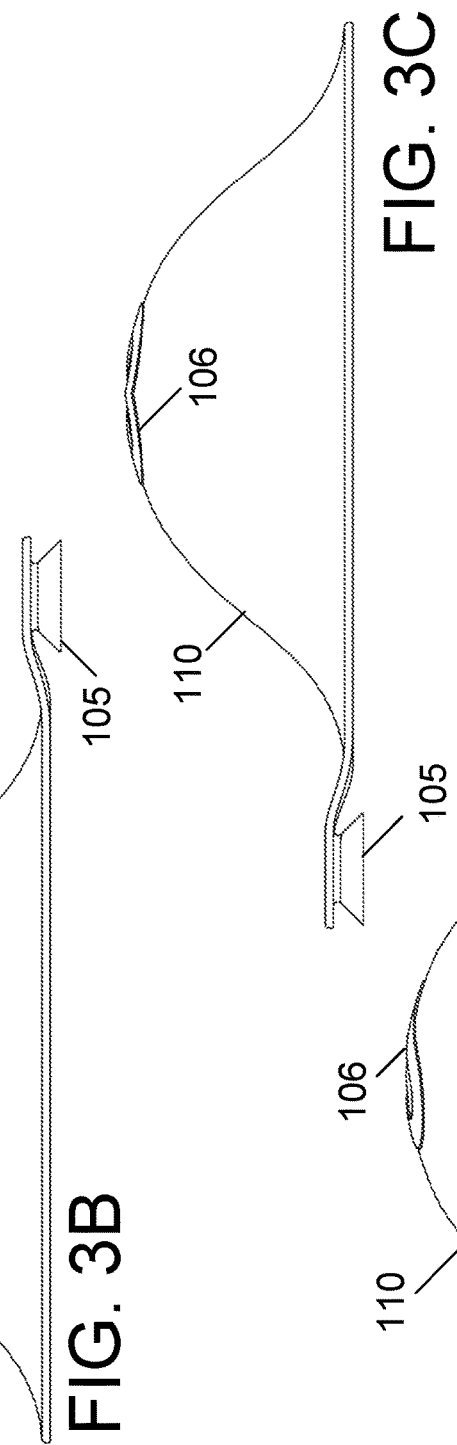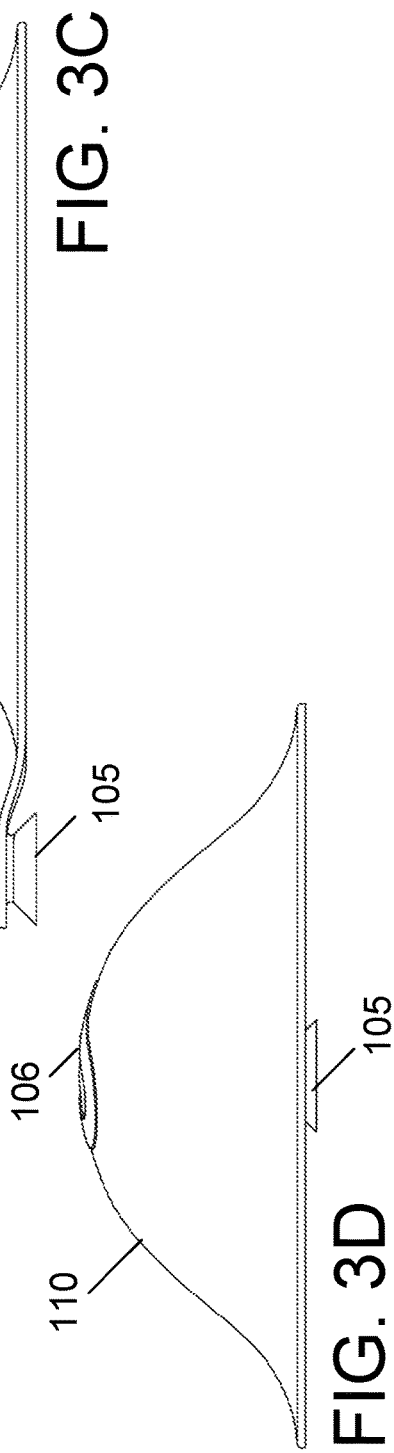

TEMPERATURE SENSING DRAIN COVER

CROSS REFERENCE TO RELATED APPLICATIONS

This application claims priority to U.S. Provisional Patent Application Ser. No. 62/287,390, filed Jan. 26, 2016; the content of which is hereby incorporated by reference herein in its entirety into this disclosure.

TECHNICAL FIELD

The subject disclosure relates generally to the field of safety devices. In particular, the subject disclosure relates to temperature sensing drain covers.

BACKGROUND

Bathing time, particularly for toddlers, or young children, can be one of the most enjoyable moments a parent can spend with the toddler, and also one of the most dangerous. Besides the potential dangers of drowning, the shear exposure of a toddler's often fully exposed skin to water, which may come out of a faucet at very high or very low temperatures, may not only leave physical but also psychological fears in a young child or toddler. Very often, a parent exposes a child to water which is too cold for the toddler, and thereby elicits a shocking cold effect. The converse is often even more dangerous as too hot a water temperature can not only temporary burn a child's tender skin, but can produce first or even second degree burns on a toddler's body depending on the temperature and duration of exposure. Thus, bathing time is often a fun time for a toddler but can also create anxiety for a parent who is trying to not only bath a child, but make sure that the bath environment is not one that is unpleasant or even dangerous for the toddler.

SUMMARY OF THE SUBJECT DISCLOSURE

The present subject disclosure provides a novel device which serves to replace or supplement a standard drain of a bath tub, and provide real time feedback to a parent in a simple color scheme which signifies a water temperature that is hot, cold, or ideal. It is also simple to use, low profile and even helps as a teaching tool to instruct a child to understanding colors and temperatures. A child can even learn to warn a parent that the temperature of the bath water is starting to drift out of the ideal range.

In one exemplary embodiment, the present subject matter is a drain cover device. The device includes a substantially circular top cover having a central domed portion surrounded by a peripheral ring portion; and a base housing contained within the top cover and including a temperature sensor and an indicator; wherein the temperature sensor extends through an aperture in the central domed portion of the top cover.

In another exemplary embodiment, the present subject matter is a drain cover device. The device includes a top cover having a central domed portion surrounded by a peripheral ring portion; and a base housing contained within the top cover and including a temperature sensor and a light source, wherein the light source emits three different colors to indicate a temperature that is too hot, too cold, and acceptable.

BRIEF DESCRIPTION OF THE DRAWINGS

Various exemplary embodiments of this disclosure will be described in detail, wherein like reference numerals refer to identical or similar components or steps, with reference to the following figures, wherein:

FIGS. 3A-3D illustrate four side views of a temperature sensing drain cover device, according to an exemplary embodiment of the present subject disclosure.

DETAILED DESCRIPTION

Particular embodiments of the present subject disclosure will now be described in greater detail with reference to the figures.

Figure 1:
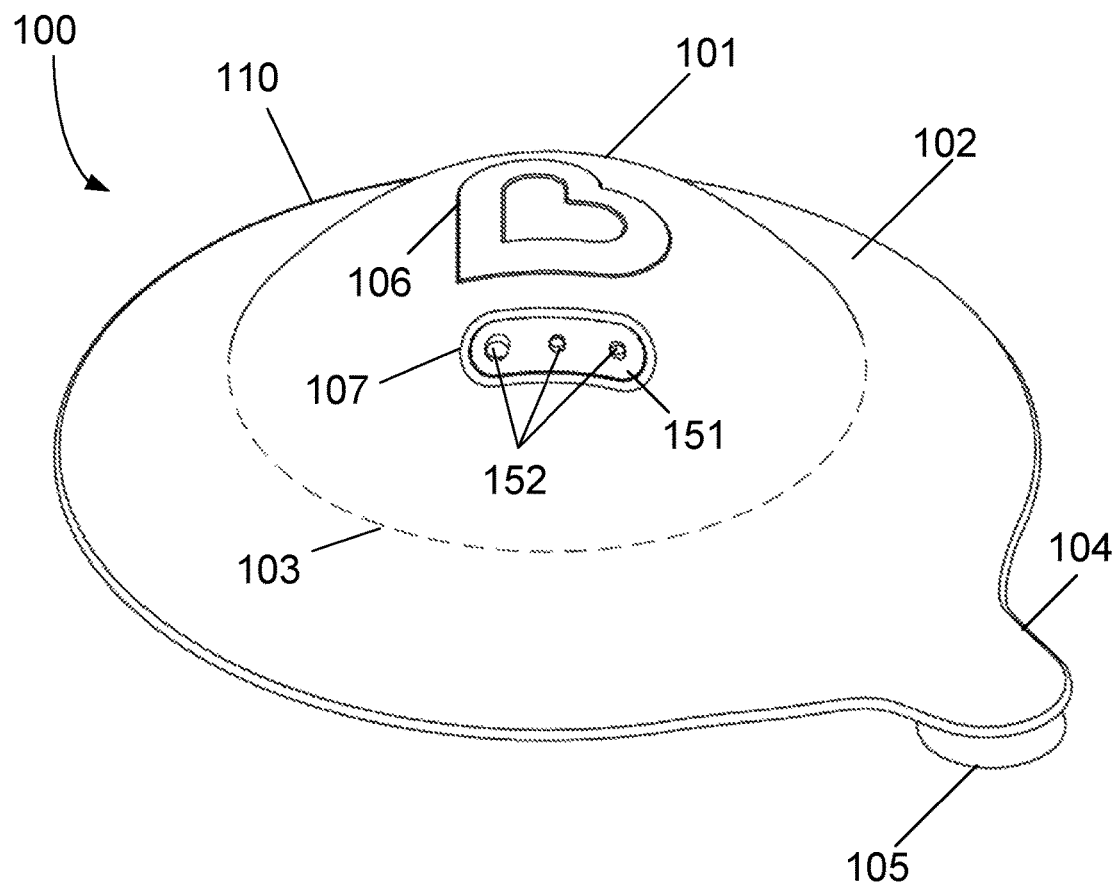
FIG. 1 illustrates a perspective view of a temperature sensing drain cover device, according to an exemplary embodiment of the present subject disclosure.

In one exemplary embodiment of the present subject matter, a temperature sensing drain cover device assembly 100 is shown in FIG. 1. The device 100 includes a top cover 110 and a base housing 150 (shown in later figures). The top cover 110 has a saucer type shape with a domed central region 101 surrounded by a flattened peripheral ring 102. A transitional line or region 103 can either smoothly transition the edge of the dome 101 with the inner edge of the peripheral ring 102, or may be a distinct connection portion between these two elements 101 and 102. An extended tab 104 projects from an outer peripheral edge of the peripheral ring 102. A suction projection 105, such as a standard suction cup, extends from a bottom portion of the extended tab 104. The entire top cover 110 including the suction projection 105 is preferably made of a soft, pliable material, such as silicone. This will allow the top cover 110 to stretch and flex as needed to cover and secure the base housing portion 150, as will be described below. A decorative projection 106 is positioned at the very top of the dome portion 101 through which light is projected from the base housing portion 150. The decorative projection 106 may be any ornamental shape or figure, such as a heart, animal, or other character which may be pleasing for a child to see. Alternatively, there may be no decorative projection 106 at all and the top of the dome 101 may be smooth and have no projection at all. The top cover 110, and especially the top of the dome 101 and the ornamental projection 106, should be a transparent material, such as a thin silicone layer, which allows for the clear distinction between different indicators, such as, for example, colored signals, shining therethrough to be seen from an external portion of the dome 101 and through a reasonable depth of water.

Top cover 110 features an aperture 107 which is designed to snugly accommodate the outer peripheral surface of a temperature sensor base 151 housing one or more temperature sensors 152. The temperature sensor base 151 and temperature sensors 152 project upwards from a top portion of the base housing unit 150, which is shown more clearly in FIG. 5B, and elsewhere.

Figure 2:
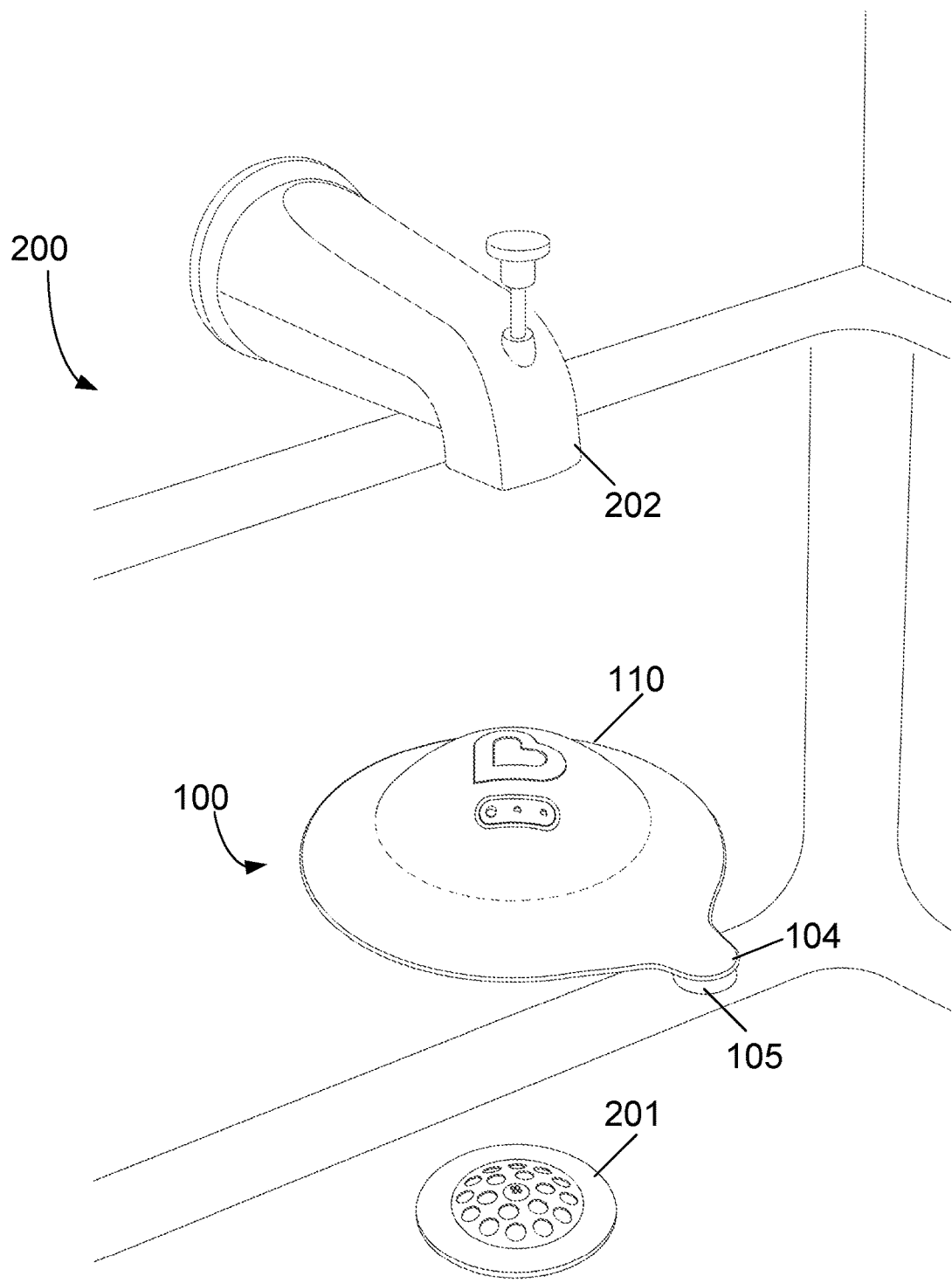
FIG. 2 illustrates a perspective view of a temperature sensing drain cover device being placed in a bath environment, according to an exemplary embodiment of the present subject disclosure.

As shown in FIG. 2, when the device 100 is placed within a bathing environment 200, the top cover 110 is positioned such that the extended tab 104 is located towards the farther end of a standard tub, away from the faucet 202 area. The device 100 is positioned directly on top of a drain hole 201, which is preferably a standard, low profile drain. In this configuration, the top cover 110 completely surrounds the outer peripheral edge of the drain hole 201, and prevents the flow of water from the tub 200 into the drain hole 201. The soft material of the outer peripheral ring 102 of the top cover 110 serves to naturally seal the drain hole 201 and promote the filling of water within the tub. The suction cup 105 may serve to further promote the stability of the position of the cover 110 over the drain hole 201 by attaching to a floor of the tub 200 and provide further connection of the device 100 to the bath tub 200. The suction cup 105 is also used to hang, dry, and store the device 100 when not in use, by attaching it to, for example, the tiled wall of a bathtub, and letting water drip from the device 100. The aperture 107 within the dome 101 is positioned substantially at the same side of the dome 101 as the extended tab 104 so that the temperature sensors 152 are directed towards the part of the tub 200 where most of the water, and the toddler, will be so that the temperature measurement is more accurate. The decorative projection 106 through which the colored signal lights project may be seen from any expected use position, including the very top and 360 degrees of periphery from the top.

FIGS. 3A-3D show side views of the top cover 110 from four different sides. As can be seen in the figures, the top cover 110 is designed to substantially surround and seal the internally positioned base housing 150 from all angles. The bottom portion of the cover 110 is substantially flat and in a single plane other than where the extended tab 104 projects upwards slightly to accommodate the downwardly facing suction cup 105, as best seen in FIGS. 3B and 3C. Also shown is that the decorative projection 106 is visible from all side angles of the top cover 110, meaning that the light signal projected is visible even from a side view of the top cover 110, which would normally not be needed in a situation where the top cover 110 is resting atop a drain hole 201. The aperture 107 which accommodates the temperature sensors 152 is generally positioned on the same side as the extended tab and suction cup 105. However, the positions of the various elements may be changed and re-arranged without departing from the scope of the present subject matter.

Figure 4A:
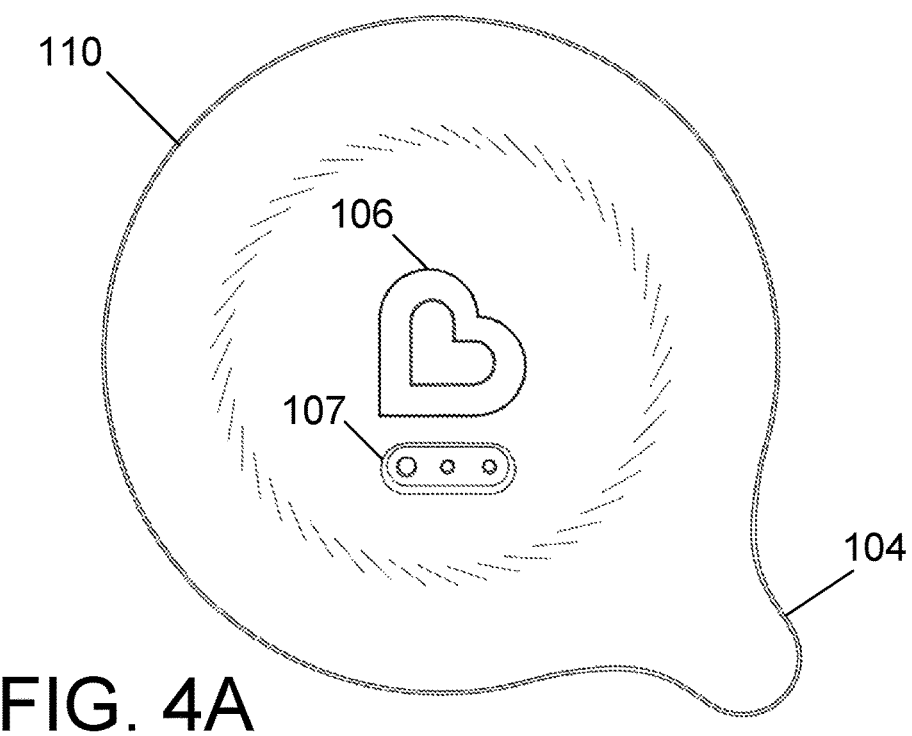
FIGS. 4A-4B illustrate top and bottom views of a temperature sensing drain cover device, according to an exemplary embodiment of the present subject disclosure.
Figure 4B:
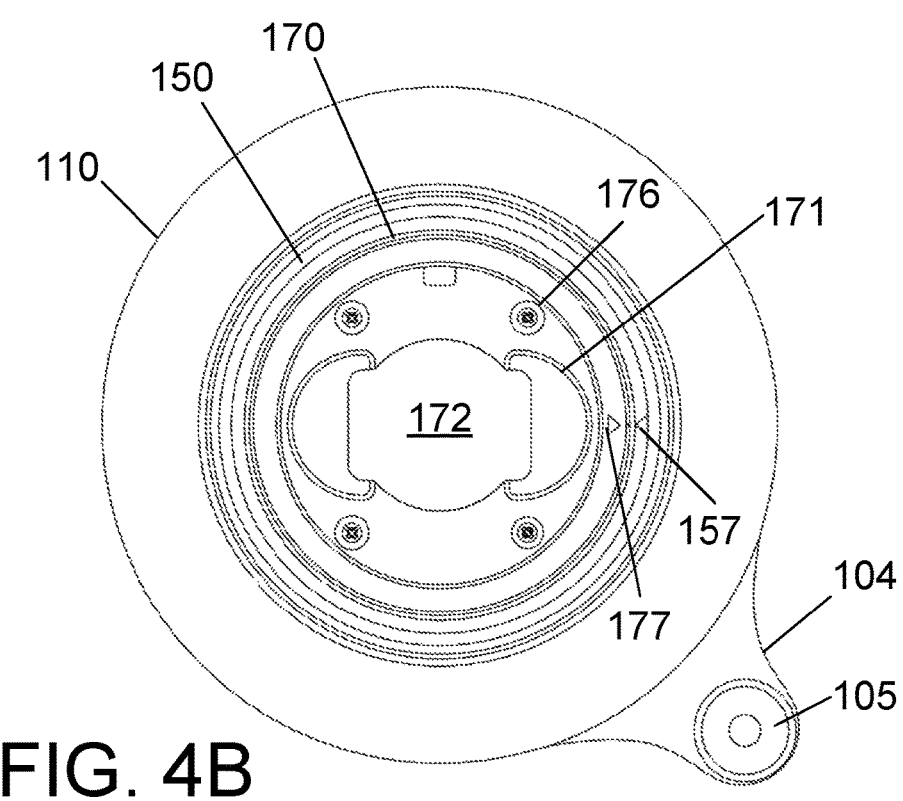

FIGS. 4A and 4B show a top and bottom view of the device 100, respectively. The top view shown in FIG. 4A is featured by the cover 110 with extended tab 104. The decorative projection 106 on the top of the dome 101 is centrally positioned within the view, and the aperture 107 is also clearly visible. This view is the most likely and clear view of the color that will be projected through the decorative projection 106 area of the dome 101. Flipping the device 100 over completely, as shown in FIG. 4B, allows the peripheral edge of the top cover 110 to be seen completely encircling and accommodating a base housing unit 150. A further housing unit door 170 serves to allow access to a battery department, as described in more detail further below. The housing unit door 170 contains one or more apertures 176 for accommodating screws which secure the housing unit door 170 to the base housing 150. One or more finger accommodating cavities 171 surround a central projection 172 which can be gripped to pull the housing unit door 170 from the base housing 150. An indicator 157 positioned on the base housing 150 is designed to correspond to a complementary indicator 177 on the housing unit door 170. When the two indicators 157 and 177 are aligned, the housing unit door 170 can be securely attached to the base housing 150 using one or more screws in the apertures 176.

Figure 5A:
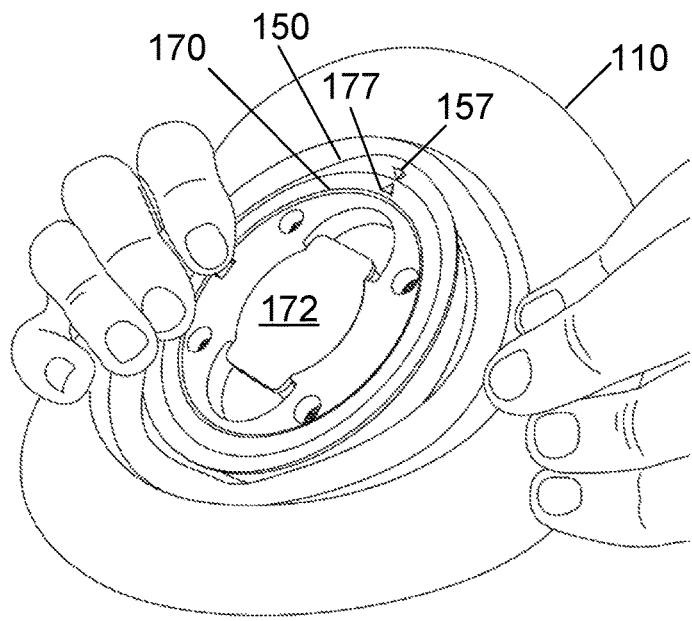
FIG. 5A illustrates a technique of separating the cover from the base housing of a temperature sensing drain cover device, according to an exemplary embodiment of the present subject disclosure.
Figure 5B:
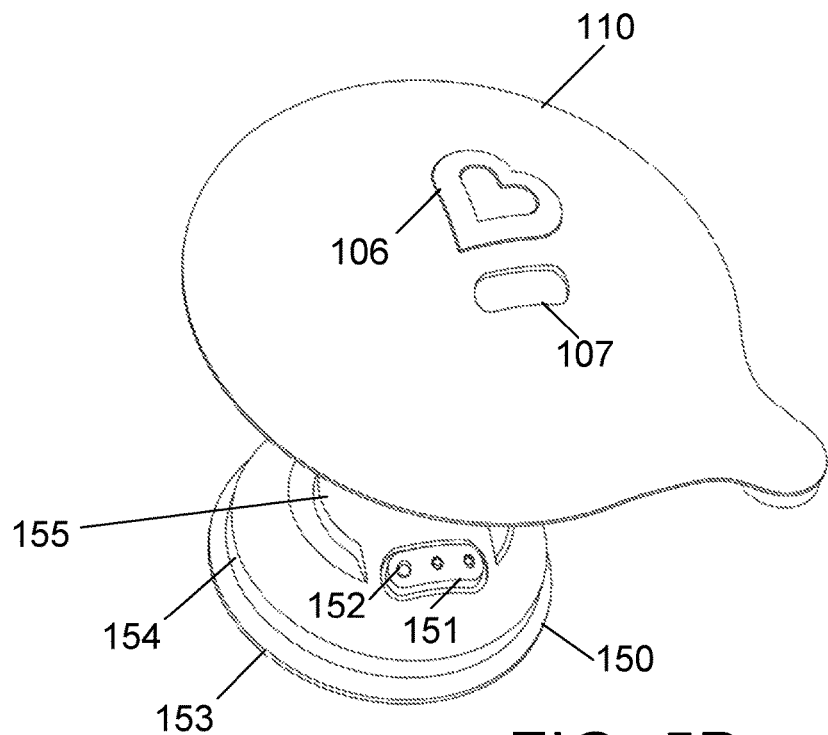
FIG. 5B illustrates the positioning of the cover and the base housing of a temperature sensing drain cover device, according to an exemplary embodiment of the present subject disclosure.

FIGS. 5A and 5B show a technique to separate the top cover 110 from the base housing 150. The outer ring 102 of the top cover 110 is grasped as shown in FIG. 5A and the base housing unit 150 may be pressed out of the interior of the cover 110. As shown, the unit door 170 remains intact with the base housing unit 150. Upon separation, as shown in FIG. 5B, the top cover 110 is completely disconnected with the base housing unit 150. The base housing unit 150 when separated from the top cover 110 includes the temperature sensor base 151 which houses one or more temperature sensors 152. A light source 155 is posited near a middle section of the circular base housing unit 150. The light source is capable of projecting various colored lights which serve to signify the temperature of the fluid in contact with the temperature sensors 152. Various other types of indicators are also possible and are within the purview of the present disclosure. The outer peripheral edge 153 of the base housing unit 150 is a thin walled edge which is adapted to fit within an accommodating crevice formed by the projected interior ring 113 in the chamber of the top cover 110, as also shown in FIGS. 6 and 8A-8C. A vertical wall 154 defines the end of the peripheral edge 153. When the top cover 110 and base housing unit 150 are desired to be reconnected, the temperature sensor base 151 is adapted to fit through the aperture 107 in the dome 101 of the top cover 110. This allows the temperature sensors 152 to have direct contact with the fluid whose temperature is to be measured.

Figure 6:
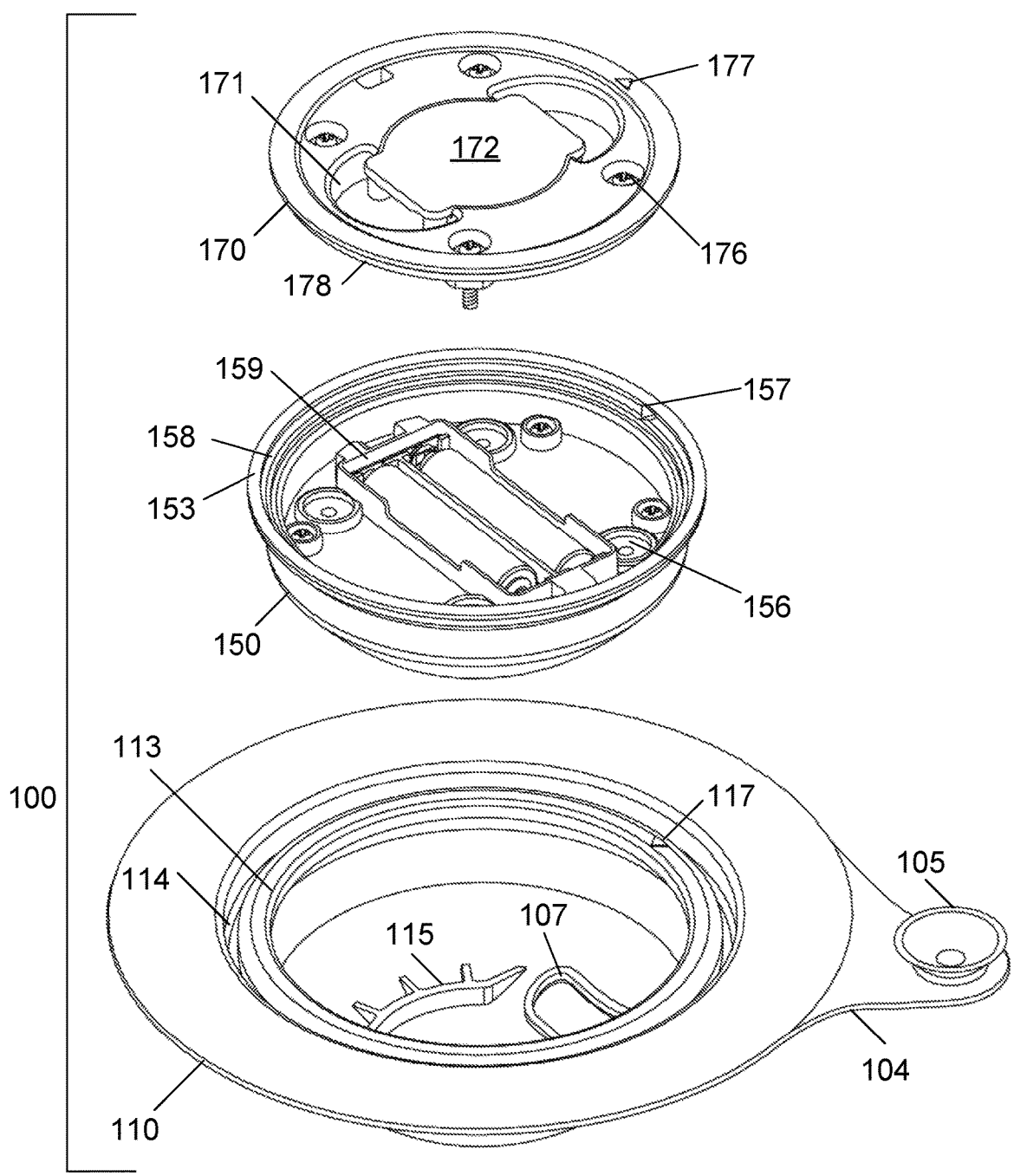
FIG. 6 illustrates an exploded view of the cover, the base housing, and the base housing door of a temperature sensing drain cover device, according to an exemplary embodiment of the present subject disclosure.

FIG. 6 shows an upside down and exploded view of the three components of device 100. The top cover 110 is shown with the extended tab 104 and suction cup 105. The interior of the top cover 110 shows the aperture 107 and a vertical projection wall 115 which serves to surround and direct light emitted from the light source 155 upwards through the middle of the dome 101, and the decorative projection 106. The peripheral edge 153 of the base housing unit 150 is adapted to slip into and underneath the projected interior ring 113 of the top cover 110. The ring 113 is encircled by an open crevice or moat 114, which serves to provide room for the ring 113 to stretch during the insertion and removal of the housing unit 150 within the top cover 110. A battery chamber 159 accommodates one or more batteries which power the temperature sensing mechanism, circuit board, internal electronics, and light emitting devices. The housing unit door 170 is connected to the base housing unit 150 by way of screw holes 176 and 156, respectively, through which one or more screws are used to secure the door 170 on to the base unit 150. An O-ring 178 on the housing unit door 170 seals with an accommodating recess 158 on the base housing unit 150 to prevent water from entering the battery chamber 159. One or more finger accommodating cavities 171 surround a central projection 172 such that the central projection 172 may be gripped and pulled away from the base housing unit 150 thereby removing the housing unit door 170. Position indicator markers 117, 157, and 177 on the top cover 110, base housing unit 150, and housing unit door 170, respectively, serve to provide ease in proper alignment of the three components. This proper alignment allows the temperature sensing base 151 of the base housing unit 150 to align with the aperture 107 of the top cover 110, and the screw holes 176 of the unit housing door 170 to align with the screw holes 156 of the base housing unit 150.

Figure 7:
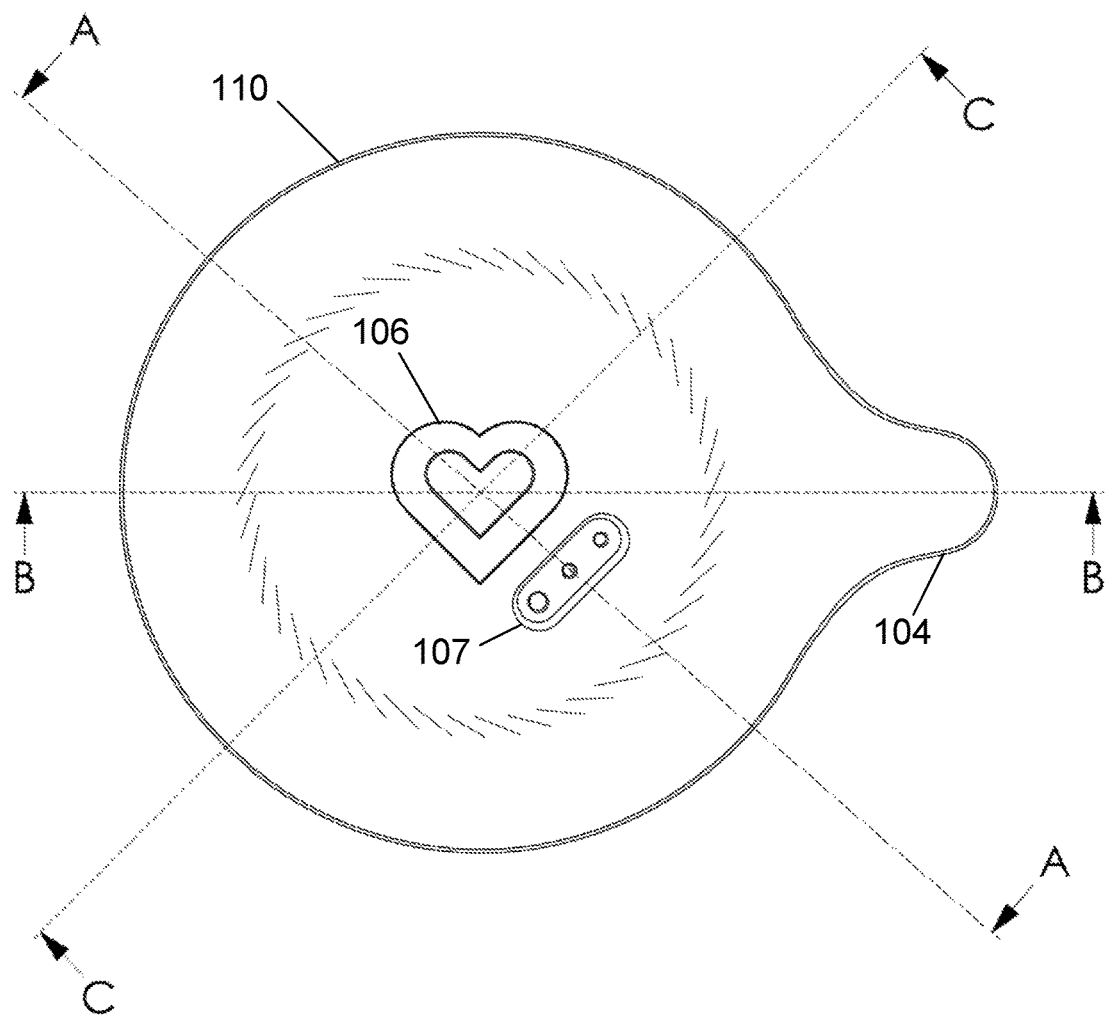
FIG. 7 illustrates a top view of a temperature sensing drain cover device with various cross sectional plains, according to an exemplary embodiment of the present subject disclosure.

FIG. 7 shows a top down view of the device 100, and particularly the upper cover 110, with the extended tab 104 projecting to the right at the 90 degree position with respect to the view of the device 100 in the figure. Three planar cuts are made through the device 100. The section A-A directional cut is made at the 135 degree to 315 degree plane, and cuts through the center temperature sensor 152 on the temperature sensor base 151, and is shown in detail in FIG. 8A. The section B-B directional cut is made at the 90 degree to 270 degree plane, and cuts through the mid portion of the extended tab 104 and suction cup 105, and is shown in detail in FIG. 8B. The section C-C directional cut is made at the 45 degree to 225 degree plane, and is shown in detail in FIG. 8C.

Figure 8A:
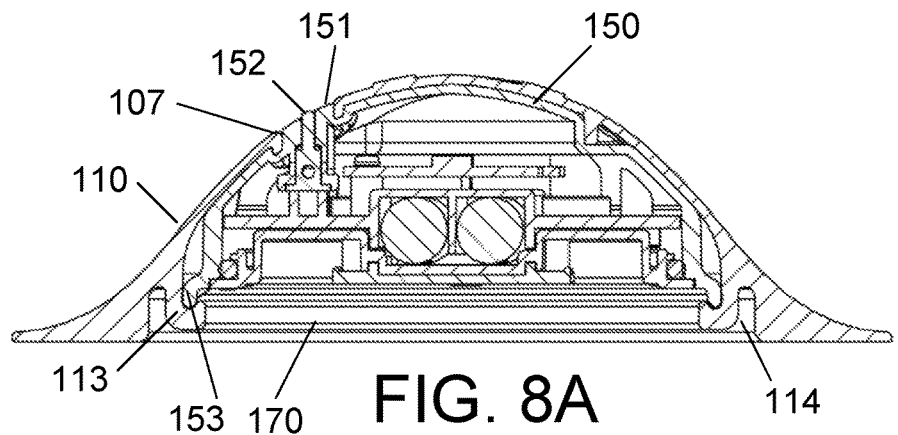
FIG. 8A illustrates a cross sectional along plane A-A of FIG. 7 of a temperature sensing drain cover device, according to an exemplary embodiment of the present subject disclosure.
Figure 8B:
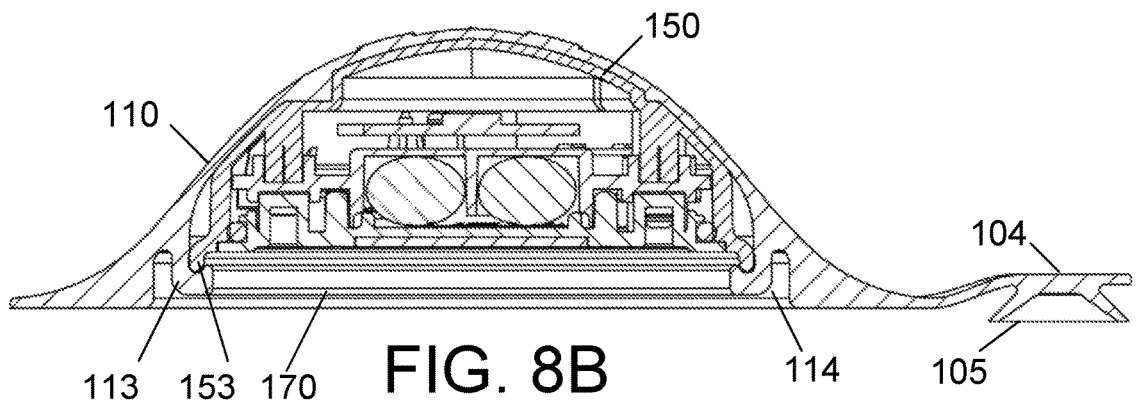
FIG. 8B illustrates a cross sectional along plane B-B of FIG. 7 of a temperature sensing drain cover device, according to an exemplary embodiment of the present subject disclosure.
Figure 8C:
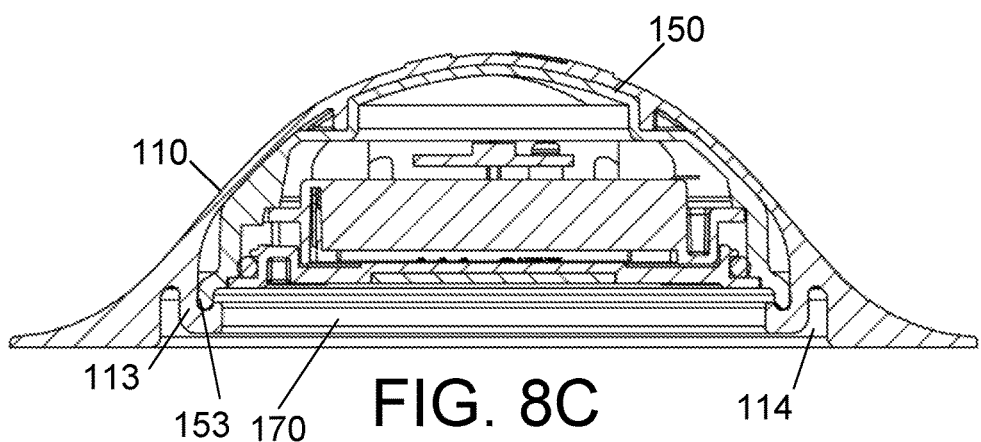
FIG. 8C illustrates a cross sectional along plane C-C of FIG. 7 of a temperature sensing drain cover device, according to an exemplary embodiment of the present subject disclosure.

FIGS. 8A, 8B, and 8C show directional views of the planar cuts through sections A-A, B-B, and C-C, respectively. The cross section cuts more clearly show the relatively thin nature of the top cover 110 which covers the entire upper and side surfaces of the base housing unit 150, with the exception of the temperature sensor base 151 projecting through the aperture 107 of the top cover 110. Further, the peripheral edge 153 of the base housing unit 150 is shown as having a larger diameter than the diameter of the peripheral ring 113 of the top cover 110. The flexibility of the material of the top cover 110 allows the larger diameter (and rigid) peripheral edge 153 of the base housing unit 150 to stretch open the circular opening made by the peripheral ring 113 into the crevice 114 of the top cover 110 and be locked into a gap directly above the peripheral ring 113, as shown in FIGS. 8A-8C. Subsequent separation of the house base unit 150 from the top cover 110 may be performed as shown in FIG. 5A.

In use, the device 100 prevents water from escaping down a drain, while letting users know when the water temperature is safe for a toddler's bath. The silicone skin protects the interior capsule (base housing) which houses an LED light and thermocouple electronics. The base housing may be water activated. For each range of temperatures, there is a corresponding LED color. When the device 100 is out of the water the illumination source 155 is not illuminated. But once placed in water, the temperature sensors 152 measure the temperature and covert the temperature into a color code which is then illuminated through light source 155, and projects through the top of the dome 101 and, optionally, through decorative projection 106.

The color code sequence representing water temperatures may be pre-programmed into the device 100. For example, one exemplary temperature to color code sequence may be: "very cold" representing measured temperatures ranging 85 degrees Fahrenheit and less, and designated as a flashing blue light from the light source 155; "cold" representing measured temperatures ranging 86-90 degrees Fahrenheit, and designated as a steady blue light from the light source 155; "acceptable temperature" representing measured temperatures ranging 91-100 degrees Fahrenheit, and designated as a steady green light from the light source 155; "hot" representing measured temperatures ranging 101-105 degrees Fahrenheit, and designated as a steady red light from the light source 155; and "very hot" representing measured temperatures ranging 106 degrees Fahrenheit and above, and designated as a flashing red light from the light source 155. Any other possible sequence and temperature range may be used as long as the designated temperatures accurately represent the acceptable, cold and hot ranges for the one getting exposed to the water. If the temperature of the water is determined to be too hot, then cold water may be added to effectively cool the temperature of the water, and vice versa. Further, it is helpful to stir the water of the tub to create circulation thereby increasing the accuracy of the measurement of the water temperature at the temperature sensor 152.

The use of device 100 is not limited to bathing of toddlers or young children. The device 100 may be used to determine the temperature of a water bath for adults, for pets, and other scenarios known to one having ordinary skill in the art. No person or animal may even have to be exposed to the water whose temperature is being measured, such as in commercial fluid vats where laundry or other objects are to be placed. The Further, the device 100 does not necessarily have to be used to cover a drain, but may be used in any tub or container of fluid, for even those which have drain covers already plugged using other mechanisms. In other words, the use of the device 100 is not dependent on whether it is actively plugging a drain hole or not.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A drain cover device comprising;
   a substantially circular top cover having a central domed portion surrounded by a peripheral ring portion; and
   a base housing contained within the top cover and including a temperature sensor and an indicator;
   wherein the temperature sensor extends through an aperture in the central domed portion of the top cover.

2. The drain cover device of claim 1, further comprising a tab extending from the peripheral ring portion of the top cover.

3. The drain cover device of claim 2, further comprising suction cup positioned on the tab.

4. The drain cover device of claim 1, wherein the indicator is a light source.

5. The drain cover device of claim 4, wherein the light source emits light through a center of the central domed portion.

6. The drain cover device of claim 4, wherein the light source emits three different colors depending on the temperature measured by the temperature sensor.

7. The drain cover device of claim 6, wherein the three different colors indicate hot, cold, and acceptable.

8. The drain cover device of claim 4, further comprising an ornamental projection positioned on the central domed portion, wherein light emitted from the light source flows through the ornamental projection.

9. The drain cover device of claim 1, wherein the temperature sensor is positioned on a temperature sensor base which houses a plurality of temperature sensors.

10. The drain cover device of claim 9, wherein the temperature sensor base projects through the aperture in the central domed portion.

11. The drain cover device of claim 1, wherein the top cover is entirely comprised of a flexible material.

12. The drain cover device of claim 11, wherein the flexible material comprises silicone.

13. The drain cover device of claim 1, wherein the base housing includes a removable door.

14. The drain cover device of claim 13, wherein the top cover, the base housing, and the removable door all include visual markers which fall in line with each when attached to each other as intended.

15. The drain cover device of claim 13, the base housing includes a battery compartment accessible by removing the removable door.

16. The drain cover device of claim 15, the base housing includes an O-ring to prevent water from entering the battery compartment.

17. The drain cover device of claim 1, wherein the top cover includes vertical projection walls which surround the light source in the base housing and direct the light through the central domed portion of the top cover.

18. The drain cover device of claim 1, wherein the base housing has a peripheral edge which slides past a projected interior ring of the top cover to lock the base housing into an internal cavity of the top cover.

19. A drain cover device comprising:

a top cover having a central domed portion surrounded by a peripheral ring portion; and a base housing contained within the top cover and including a temperature sensor and a light source, wherein the light source emits three different colors to indicate a temperature that is too hot, too cold, and acceptable.

20. The drain cover device of claim 19, wherein the temperature sensor extends through an aperture in the central domed portion of the top cover.

* * * * *